(12) United States Patent
Muramatsu et al.

(10) Patent No.: US 11,315,140 B2
(45) Date of Patent: Apr. 26, 2022

(54) CHARGING PROCESSING SYSTEM

(71) Applicants: TOYOTA JIDOSHA KABUSHIKI KAISHA, Toyota (JP); CHUBU ELECTRIC POWER CO., INC., Nagoya (JP)

(72) Inventors: Makito Muramatsu, Toyota (JP); Takumi Shibano, Nagoya (JP); Masashi Tanaka, Nagakute (JP); Takashi Ochiai, Nagoya (JP); Takeharu Fukui, Nagoya (JP); Yoshihiro Takamura, Nagoya (JP); Takahiro Yokogawa, Nagoya (JP); Masashi Ohgashira, Nagoya (JP)

(73) Assignees: TOYOTA JIDOSHA KABUSHIKI KAISHA, Toyota (JP); CHUBU ELECTRIC POWER CO., INC., Nagoya (JP)

(*) Notice: Subject to any disclaimer, the term of this patent is extended or adjusted under 35 U.S.C. 154(b) by 298 days.

(21) Appl. No.: 16/713,242

(22) Filed: Dec. 13, 2019

(65) Prior Publication Data
US 2020/0198492 A1 Jun. 25, 2020

(30) Foreign Application Priority Data
Dec. 21, 2018 (JP) .............................. JP2018-240080

(51) Int. Cl.
*G06Q 30/02* (2012.01)
*B60L 53/50* (2019.01)
(Continued)

(52) U.S. Cl.
CPC .......... *G06Q 30/0238* (2013.01); *B60L 53/50* (2019.02); *B60L 53/51* (2019.02);
(Continued)

(58) Field of Classification Search
CPC ........ B60L 53/665; B60L 53/50; B60L 53/51; B60L 53/52; B60L 53/66; G06Q 20/322;
(Continued)

(56) References Cited

U.S. PATENT DOCUMENTS

| 2010/0256846 A1* | 10/2010 | Shaffer | ................... B60L 53/63 701/22 |
| 2014/0049216 A1* | 2/2014 | Nakagawa | .............. B60L 53/00 320/109 |

(Continued)

FOREIGN PATENT DOCUMENTS

| JP | 2010055360 A | 3/2010 |
| JP | 2015015801 A | 1/2015 |

(Continued)

*Primary Examiner* — Richard Isla
*Assistant Examiner* — Manuel Hernandez
(74) *Attorney, Agent, or Firm* — Dickinson Wright, PLLC

(57) ABSTRACT

A charging processing system includes: a power supply facility that supplies $CO_2$ free power generated using renewable energy; a vehicle in which $CO_2$ free charging is able to be performed to charge an onboard power storage device using the $CO_2$ free power supplied from the power supply facility; a mobile terminal portable by a user of the vehicle; and a server. The server issues, when the $CO_2$ free charging is performed in the vehicle, a coupon to the user of the vehicle in which the $CO_2$ free charging is performed, the coupon being usable at a shop located around the power supply facility. When a timing to perform the $CO_2$ free charging is included in a specific time period, the server increases the number of issued coupons and a usage value of each coupon.

4 Claims, 7 Drawing Sheets

(51) Int. Cl.
  *B60L 53/66* (2019.01)
  *H02J 7/00* (2006.01)
  *G06Q 20/32* (2012.01)
  *B60L 53/51* (2019.01)
  *B60L 53/52* (2019.01)

(52) U.S. Cl.
  CPC ............... *B60L 53/52* (2019.02); *B60L 53/66* (2019.02); *B60L 53/665* (2019.02); *G06Q 20/322* (2013.01); *G06Q 30/0207* (2013.01); *G06Q 30/0235* (2013.01); *H02J 7/00034* (2020.01); *H02J 2300/20* (2020.01)

(58) Field of Classification Search
  CPC ........... G06Q 30/0207; G06Q 30/0235; G06Q 30/0238; H02J 7/00034; H02J 2300/20
  USPC ....................... 320/109, 101; 705/14.1, 14.38
  See application file for complete search history.

(56) References Cited

U.S. PATENT DOCUMENTS

| | | | |
|---|---|---|---|
| 2015/0046222 A1 | 2/2015 | Ishii | |
| 2019/0092176 A1* | 3/2019 | Uyeki | ................... B60L 53/665 |
| 2020/0198493 A1* | 6/2020 | Muramatsu | ........ G06Q 30/0238 |

FOREIGN PATENT DOCUMENTS

| | | |
|---|---|---|
| JP | 2017041939 A | 2/2017 |
| WO | 2013/115318 A1 | 8/2013 |
| WO | 2015/145923 A1 | 10/2015 |

* cited by examiner

CHARGING PROCESSING SYSTEM

This nonprovisional application is based on Japanese Patent Application No. 2018-240080 filed on Dec. 21, 2018, with the Japan Patent Office, the entire contents of which are hereby incorporated by reference.

BACKGROUND

Field

The present disclosure relates to a charging processing system applied to a charging control system that charges an onboard power storage device using renewable energy.

Description of the Background Art

Japanese Patent Laying-Open No. 2017-41939 discloses a system that externally charges an onboard power storage device using power supplied from a power supply device external to a vehicle. This system includes a charging service provision server and a coupon service provision server. The charging service provision server receives, from a mobile terminal operated by a user, authentication information of the user and information relating to validity of payment information. When the authentication information is valid and the payment information is valid, the charging service provision server transmits a charging start request to the power supply device. Moreover, in response to the start of charging by the power supply device, the charging service provision server requests the coupon service provision server to issue a coupon. In response to the request, the coupon service provision server issues, to the mobile terminal, a coupon usable at a shop located around the power supply device. Accordingly, while waiting during the external charging, the user can use the coupon by way of the mobile terminal at the shop located around the power supply device.

SUMMARY

In recent years, for global environment protection, power generation facilities for generating power using renewable energy (such as solar energy, wind power energy, geothermal energy, and biomass energy) involving low environmental impact, rather than fossil energy (such as oil, coal, and natural gas) involving high environmental impact, are being pervasive. Accordingly, it is desired to develop a technique for promoting external charging with power generated using such renewable energy.

However, in the system disclosed in Japanese Patent Laying-Open No. 2017-41939 described above, no technique for promoting external charging with the renewable energy is mentioned at all. Therefore, there is room for improvement.

The present disclosure has been made to solve the above-described problem, and has an object to promote external charging with renewable energy appropriately in a specific time period.

It should be noted that in the description below, power generated using the renewable energy will be also referred to as "$CO_2$ free power", and external charging with such $CO_2$ free power will be also referred to as "$CO_2$ free charging".

(1) A charging processing system according to the present disclosure includes: a power supply facility that supplies $CO_2$ free power generated using renewable energy; an electrically powered vehicle in which $CO_2$ free charging is able to be performed to charge an onboard power storage device using the $CO_2$ free power supplied from the power supply facility; a mobile terminal portable by a user of the electrically powered vehicle; and a server. The server issues, when the $CO_2$ free charging is performed in the electrically powered vehicle, a coupon to the mobile terminal of the user of the electrically powered vehicle in which the $CO_2$ free charging is performed, the coupon being usable at a shop located around the power supply facility. When a timing to perform the $CO_2$ free charging is included in a specific time period, the server increases at least one of the number of issued coupons and a usage value of each coupon as compared with a case where the timing to perform the $CO_2$ free charging is not included in the specific time period.

According to the above-described system, the coupon usable at the shop located around the power supply facility is issued to the mobile terminal of the user of the electrically powered vehicle in which the $CO_2$ free charging is performed. In this case, when the timing to perform the $CO_2$ free charging is included in the specific time period, the number of issued coupons or the usage value of each coupon are increased as compared with a case where the timing to perform the $CO_2$ free charging is not included in the specific time period. Therefore, the user can obtain a larger number of coupons by visiting the shop and performing the $CO_2$ free charging in the specific time period. Moreover, the shop can increase the customer attracting rate by attracting a larger number of users in the specific time period. As a result, the $CO_2$ free charging (external charging using renewable energy) can be promoted appropriately in the specific time period.

(2) In a certain embodiment, the specific time period includes a time period in which a customer attracting rate in the shop is lower than a predetermined rate.

According to the above-described embodiment, the number of issued coupons or the usage value of each coupon is increased in the time period (for example, a time period in a daytime of a weekday) in which the customer attracting rate in the shop is lower than the predetermined rate. Therefore, the customer attracting rate in the shop can be improved during the time period in which the customer attracting rate is low, thus leveling out the customer attracting rate.

(3) In a certain embodiment, the specific time period includes a time period in which an amount of surplus of the $CO_2$ free power suppliable by the power supply facility is more than a predetermined amount.

According to the above-described embodiment, the number of issued coupons or the usage value of each coupon is increased in a time period (for example, a time period in a daytime with large solar intensity in the case where the $CO_2$ free power is power generated using solar light) in which the amount of surplus of the $CO_2$ free power is large. Therefore, the $CO_2$ free power can be effectively used while avoiding the surplus of the $CO_2$ free power from being unused.

(4) In a certain embodiment, the specific time period includes a time period in which weather is forecasted to be fine.

According to the above-described embodiment, for example, in accordance with an increase in the amount of surplus of the $CO_2$ free power in fine weather in the case where the $CO_2$ free power is power generated using solar light, the number of issued coupons or the usage value of each coupon can be increased in the time period in which weather is forecasted to be fine. Therefore, the $CO_2$ free power can be effectively used while avoiding the surplus of the $CO_2$ free power from being unused. Moreover, the user can obtain a larger number of coupons by visiting the shop and performing the $CO_2$ free charging in the time period in which weather is forecasted to be fine. The shop can increase the customer attracting rate by attracting a larger number of users in the time period in which weather is forecasted to be fine.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
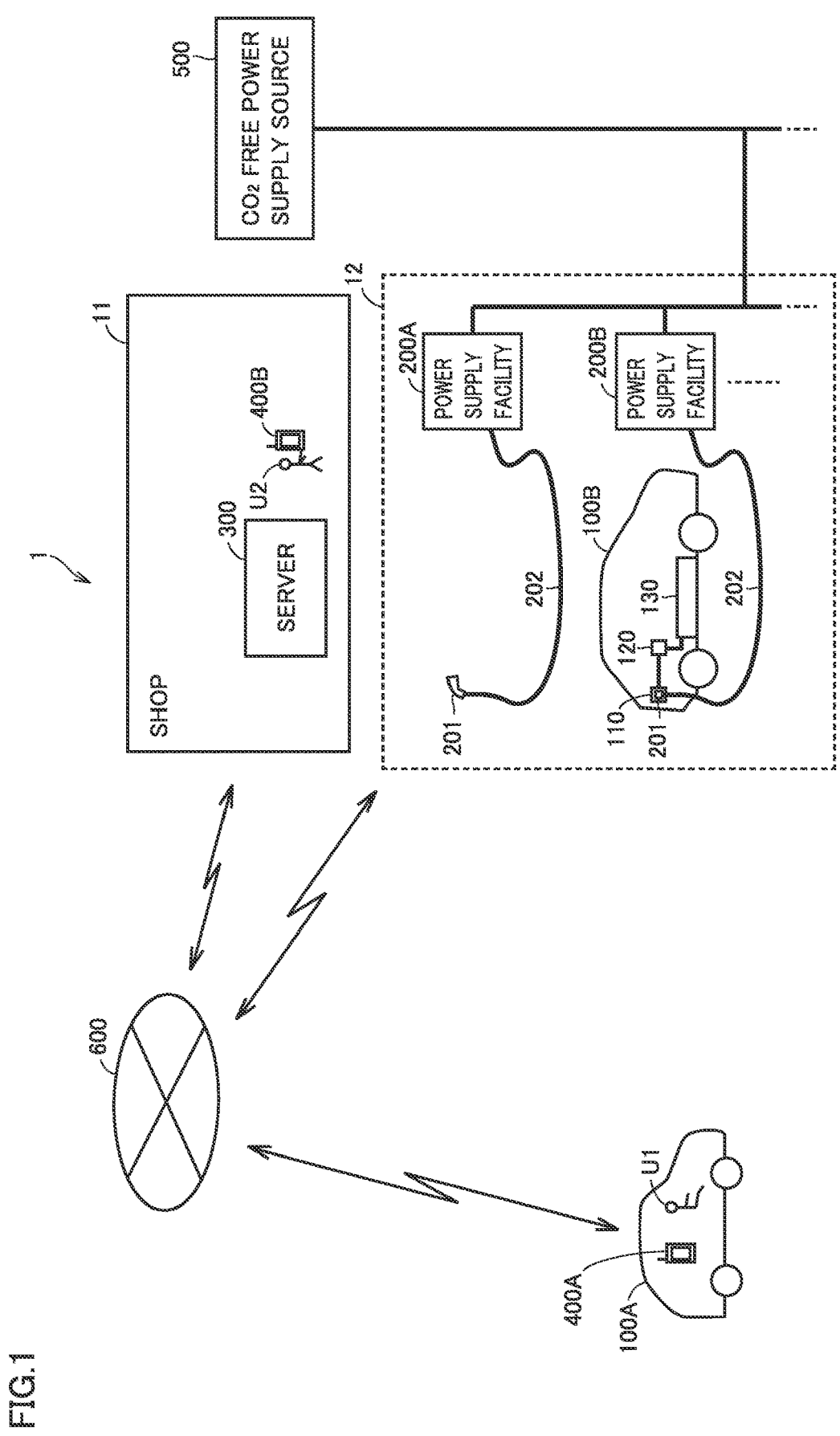
FIG. 1 schematically shows an exemplary entire configuration of a charging processing system.

The following describes embodiments of the present disclosure with reference to figures in detail. It should be noted that the same or corresponding portions in the figures are given the same reference characters and are not described repeatedly.

<System Configuration>

FIG. 1 schematically shows an exemplary entire configuration of a charging processing system 1 according to the present embodiment. This charging processing system 1 includes vehicles 100A, 100B, power supply facilities 200A, 200B, a server 300, and mobile terminals 400A, 400B.

It should be noted that the basic configurations of vehicle 100A, power supply facility 200A, and mobile terminal 400A are the same as the basic configurations of vehicle 100B, power supply facility 200B, and mobile terminal 400B, respectively. Therefore, in the description below, vehicle 100A and vehicle 100B may be described also as "vehicle 100" without distinguishing vehicle 100A and vehicle 100B from each other, power supply facility 200A and power supply facility 200B may be described also as "power supply facility 200" without distinguishing power supply facility 200A and power supply facility 200B from each other, and mobile terminal 400A and mobile terminal 400B may be described also as "mobile terminal 400" without distinguishing mobile terminal 400A and mobile terminal 400B from each other, unless they are described in a distinguished manner.

Power supply facility 200 is installed in a parking area 12 adjacent to a shop 11. It should be noted that any number of power supply facilities 200 may be installed in parking area 12. One or a plurality of (two or more) power supply facilities 200 may be installed. Shop 11 may be a facility including a plurality of shops such as a shopping center, or may be one shop.

Power supply facility 200 includes a charging cable 202 having a connector 201 at its tip, and can supply power to vehicle 100 via charging cable 202. Power supply facility 200 is connected to a $CO_2$ free power supply source 500, and receives $CO_2$ free power from $CO_2$ free power supply source 500. Renewable energy is energy (such as solar energy, wind power energy, geothermal energy, and biomass energy) that is not exhausted, that can be used repeatedly, and that involves low environmental impact. Power supply facility 200 can supply vehicle 100 with the $CO_2$ free power received from $CO_2$ free power supply source 500. It should be noted that $CO_2$ free power supply source 500 may be a facility itself that is installed by shop 11 and that generates $CO_2$ free power, or may be a facility that is operated by an electric power company or the like and that aggregates $CO_2$ free power generated in a plurality of areas. Moreover, the $CO_2$ free power may be power obtained by adding an environmental value to fossil-derived power by way of J-Credit, Non-Fossil Fuel Energy Certificate, or the like.

Vehicle 100 includes an inlet 110, a power conversion device 120, and a power storage device 130. Vehicle 100 is an electrically powered vehicle (such as a plug-in hybrid vehicle or an electric vehicle) that can travel using power stored in power storage device 130. Examples of power storage device 130 employed herein include: a secondary battery such as a lithium ion battery or a nickel-metal hydride battery; and a large-capacity capacitor.

In vehicle 100, the "$CO_2$ free charging" can be performed to charge onboard power storage device 130 using the $CO_2$ free power supplied from power supply facility 200 external to the vehicle. Specifically, the $CO_2$ free power received by inlet 110 from power supply facility 200 is supplied to power storage device 130 via power conversion device 120. In this way, the $CO_2$ free charging is performed. It should be noted that during the $CO_2$ free charging, vehicle 100 and power supply facility 200 may be configured to wiredly communicate with each other via charging cable 202.

FIG. 1 shows an example in which: vehicle 100A is driven by a user U1, who is an owner of vehicle 100A, to travel toward parking area 12 of shop 11; the $CO_2$ free charging is being performed in vehicle 100B with vehicle 100B being connected to power supply facility 200B installed in parking area 12 of shop 11; and a user U2, who is an owner of vehicle 100B, is doing shopping at shop 11 during waiting time for the $CO_2$ free charging.

Mobile terminal 400 is a terminal (for example, a smartphone or a wearable device such as a smartwatch) portable by the owner of vehicle 100. It should be noted that mobile terminals 400A, 400B shown in FIG. 1 are carried by users U1, U2, respectively.

Server 300 is provided in shop 11, and issues a coupon usable at shop 11. It should be noted that FIG. 1 shows an example in which server 300 is provided in shop 11; however, server 300 is not limited to being provided in shop 11. For example, a part or whole of the function of server 300 may be provided outside shop 11.

Vehicle 100, power supply facility 200, server 300, and mobile terminal 400 can wiredly or wirelessly access a communication network 600 and can communicate with one another via communication network 600. For communication network 600, any communication network can be employed. Communication network 600 may be the Internet.

With reference to FIG. 2 to FIG. 5, the following sequentially describes respective configurations of vehicle 100, power supply facility 200, server 300, and mobile terminal 400.

Figure 2:
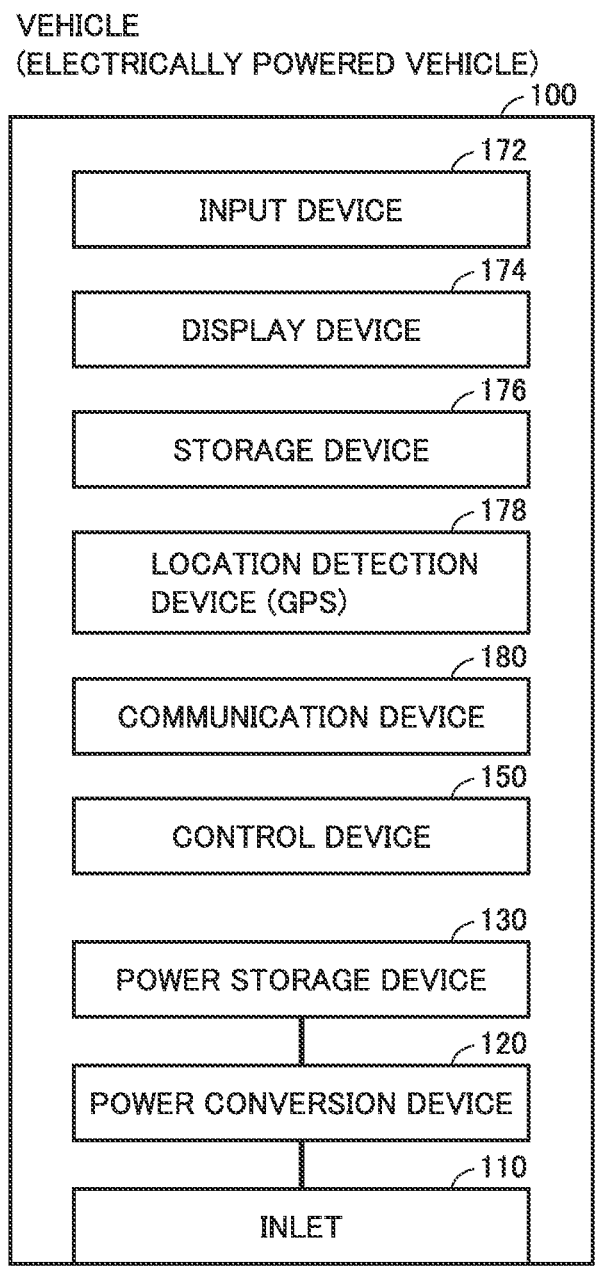
FIG. 2 schematically shows an exemplary configuration of a vehicle.

FIG. 2 schematically shows an exemplary configuration of vehicle 100. In addition to inlet 110, power conversion device 120, and power storage device 130 described above, vehicle 100 includes an input device 172, a display device 174, a storage device 176, a location detection device 178, a communication device 180, and a control device 150.

Input device 172 is constituted of a touch panel, a switch, or the like, and receives an operation by the user. Display device 174 is constituted of, for example, a liquid crystal panel, and presents, to the user, various types of information in accordance with instructions from control device 150.

Storage device 176 stores various pieces of information such as: information used for various types of control; information input into input device 172; and information received by communication device 180 from the outside.

Location detection device 178 uses GPS (Global Positioning System) to detect information indicating a current location (longitude and latitude) of vehicle 100.

Communication device 180 is an interface for communicating with power supply facility 200, server 300, and mobile terminal 400 via communication network 600.

Control device 150 is configured to include a CPU (Central Processing Unit), and performs control (the above-described $CO_2$ free charging or the like) for each device of vehicle 100.

Figure 3:
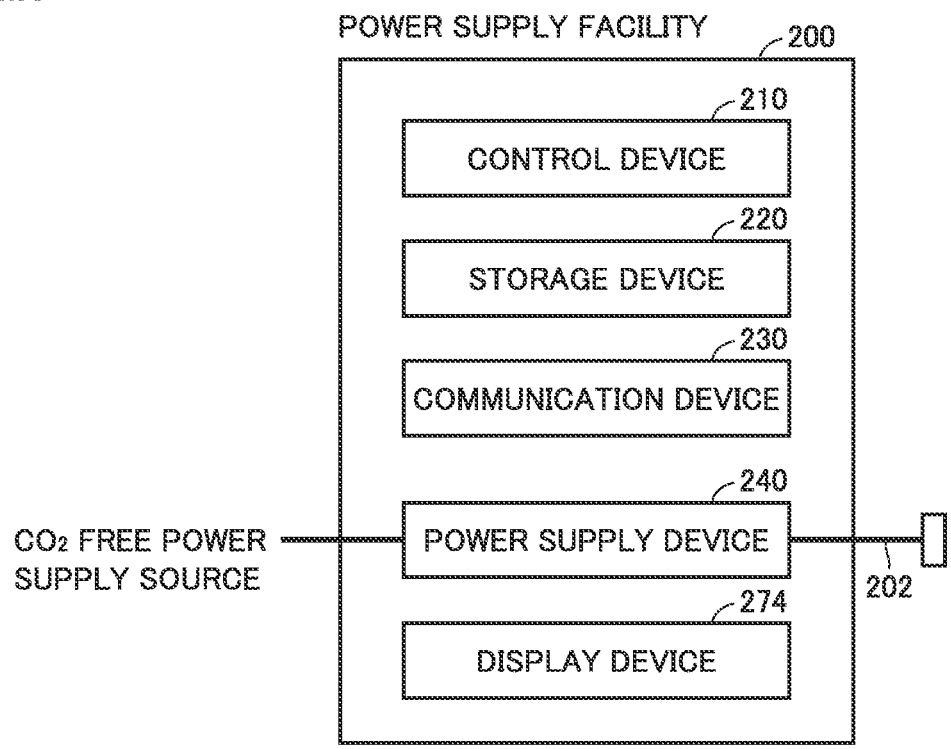
FIG. 3 schematically shows an exemplary configuration of a power supply facility.

FIG. 3 schematically shows an exemplary configuration of power supply facility 200. Power supply facility 200 includes a control device 210, a storage device 220, a communication device 230, a power supply device 240, and a display device 274.

Communication device 230 is an interface for communicating with vehicle 100, server 300, and mobile terminal 400 via communication network 600, for example.

Power supply device 240 is a device for supplying, to vehicle 100 via charging cable 202, the $CO_2$ free power supplied from $CO_2$ free power supply source 500.

Storage device 220 stores various pieces of information such as: information used for various types of control; information received by communication device 230 from outside; and history information of the $CO_2$ free power supplied to vehicle 100 by power supply device 240.

Display device 274 is constituted of, for example, a liquid crystal panel, and presents, to the user, various types of information in accordance with instructions from control device 210.

Control device 210 is configured to include a CPU (Central Processing Unit), and performs control for each device of power supply facility 200.

Figure 4:
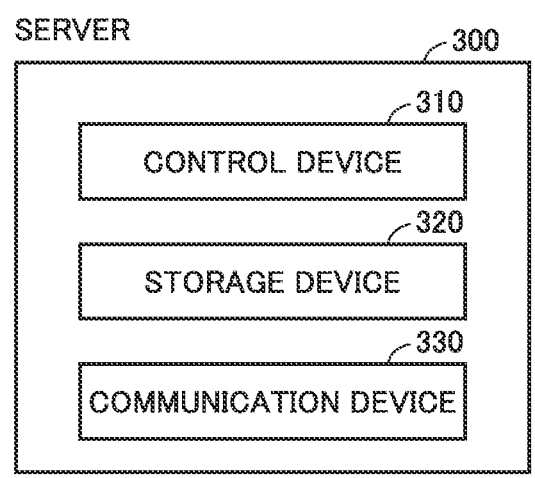
FIG. 4 schematically shows an exemplary configuration of a server.

FIG. 4 schematically shows an exemplary configuration of server 300. Server 300 includes a control device 310, a storage device 320, and a communication device 330.

Communication device 330 is an interface for communicating with vehicle 100, power supply facility 200, and mobile terminal 400 via communication network 600, for example.

Storage device 320 stores various pieces of information such as: information used for various types of control; and information received by communication device 330 from outside.

It should be noted that "power supply facility information" is stored in storage device 320 in advance. In the power supply facility information, a power supply facility ID for specifying power supply facility 200 is associated with the installation location of power supply facility 200 specified by the power supply facility ID. Moreover, in storage device 320, "user attribute information" is registered in advance. In the user attribute information, an user ID for specifying the user of mobile terminal 400 having a below-described coupon application installed thereon is associated with attribution information (sex, age, and the like) of the user. In the description below, the user registered in the user attribute information will be also referred to as "registered user".

Control device 310 is configured to include a CPU (Central Processing Unit), and performs control for each device of server 300. Control device 310 communicates with mobile terminal 400, and performs a process for issuing, to mobile terminal 400, a coupon usable at shop 11.

Figure 5:
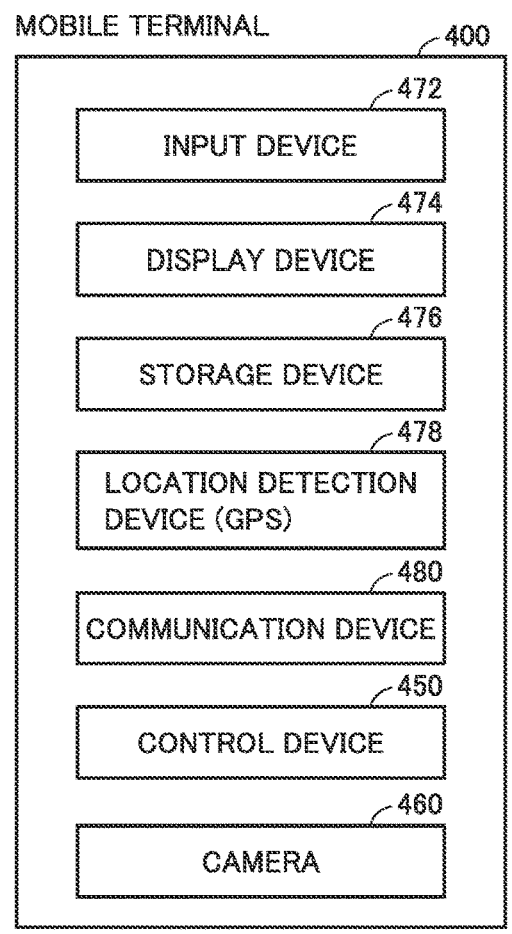
FIG. 5 schematically shows an exemplary configuration of a mobile terminal.

FIG. 5 schematically shows an exemplary configuration of mobile terminal 400. Mobile terminal 400 includes an input device 472, a display device 474, a storage device 476, a location detection device 478, a communication device 480, a control device 450, and a camera 460.

Input device 472 is constituted of a touch panel, a switch, or the like, and receives an operation by the user. Display device 474 is constituted of, for example, a liquid crystal panel, and presents, to the user, various types of information in accordance with instructions from control device 450.

Storage device 476 stores various pieces of information such as: information used for various types of control; information input into input device 472; and information received by communication device 480 from outside.

Location detection device 478 uses GPS (Global Positioning System) to detect information indicating a current location (longitude and latitude; hereinafter, also referred to as "user location") of mobile terminal 400.

Communication device 480 is an interface for communicating with vehicle 100, power supply facility 200, and server 300 via communication network 600, for example.

Control device 450 is configured to include a CPU (Central Processing Unit), and performs control for each device of mobile terminal 400.

It should be noted that mobile terminal 400 has a dedicated application (hereinafter, also referred to as "coupon application") installed thereon to request server 300 to issue a coupon and receive the coupon from server 300. When installing this coupon application, the user of mobile terminal 400 inputs his/her attribution information (sex, age, and the like) and transmits it to server 300. This attribution information is registered, together with the user ID, in the user attribute information stored in storage device 320 of server 300.

<Advance Notice and Issuance of Coupon Accompanied with $CO_2$ Free Charging>

In order to promote the $CO_2$ free charging and attract customers to shop 11, server 300 according to the present embodiment performs a process (hereinafter, also referred to as "coupon issuance process") for issuing a coupon usable at shop 11 to the registered user of vehicle 100 in which the $CO_2$ free charging is performed using power supply facility 200 installed in parking area 12 of shop 11.

Moreover, server 300 according to the present embodiment performs a process (hereinafter, also referred to as "coupon advance-notice process") for notifying, to the registered user, information (hereinafter, also referred to as "coupon advance-notice information") about a coupon to be issued.

The following sequentially describes the coupon advance-notice process and the coupon issuance process.

<<Advance Notice of Coupon>>

Figure 6:
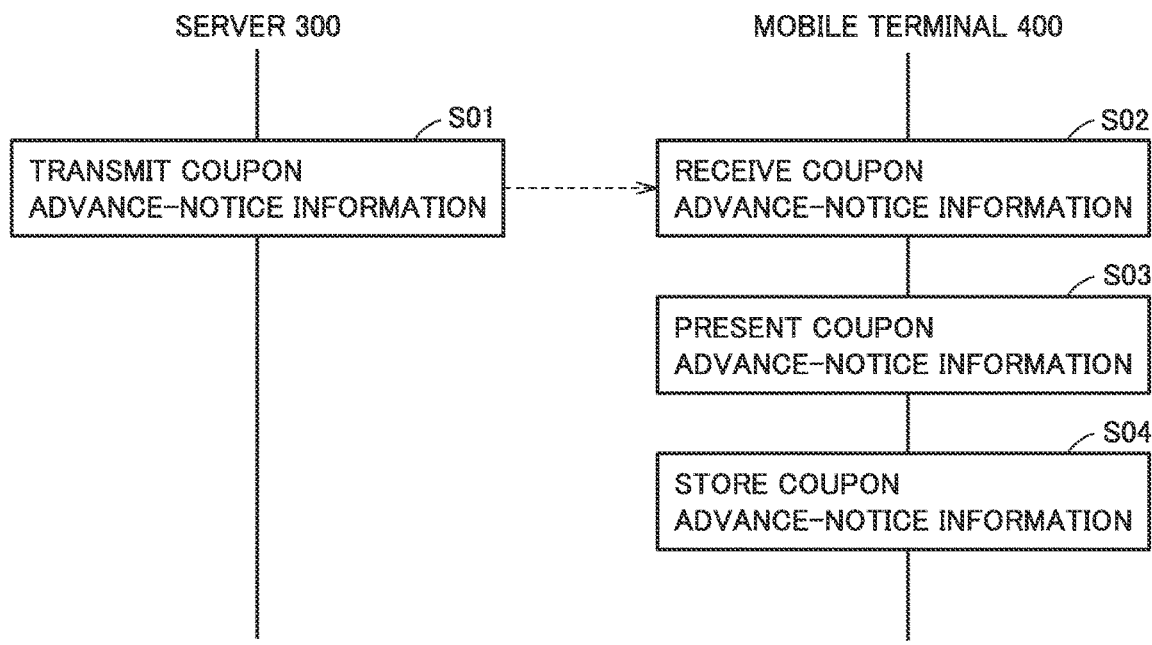
FIG. 6 is a sequence diagram showing an exemplary overview of a coupon advance-notice process and a process associated with the coupon advance-notice process.

FIG. 6 is a sequence diagram showing an exemplary overview of the coupon advance-notice process and a process associated with the coupon advance-notice process. These processes are associated with server 300 (more specifically, control device 310) and mobile terminal 400 (more specifically, control device 450).

Server 300 transmits the coupon advance-notice information at a predetermined timing to mobile terminal 400 of the registered user (step S01). The coupon advance-notice information includes various pieces of information such as a date, a day of a week, a time period, the number of issued coupons, monetary amounts of issued coupons, a shop, a merchandise item, and a service with regard to the coupon to be issued. A timing to transmit the coupon advance-notice information can be set appropriately. For example, the coupon advance-notice information may be transmitted at a predetermined timing (for example, a specific time on a specific day of a week), or at a timing that is changed depending on a situation as to attracted customers in shop 11 or the like.

Mobile terminal 400 receives the coupon advance-notice information from server 300 (step S02), and presents the received coupon advance-notice information on display device 474 (step S03). Accordingly, the coupon advance-notice information is presented to the registered user, thus promoting the registered user to visit shop 11 and perform the $CO_2$ free charging.

Then, mobile terminal 400 stores the received coupon advance-notice information into storage device 476. The user can operate input device 472 as required, to read out the coupon advance-notice information stored in storage device 476 and present it on display device 474.

<<Issuance of Coupon>>

Figure 7:
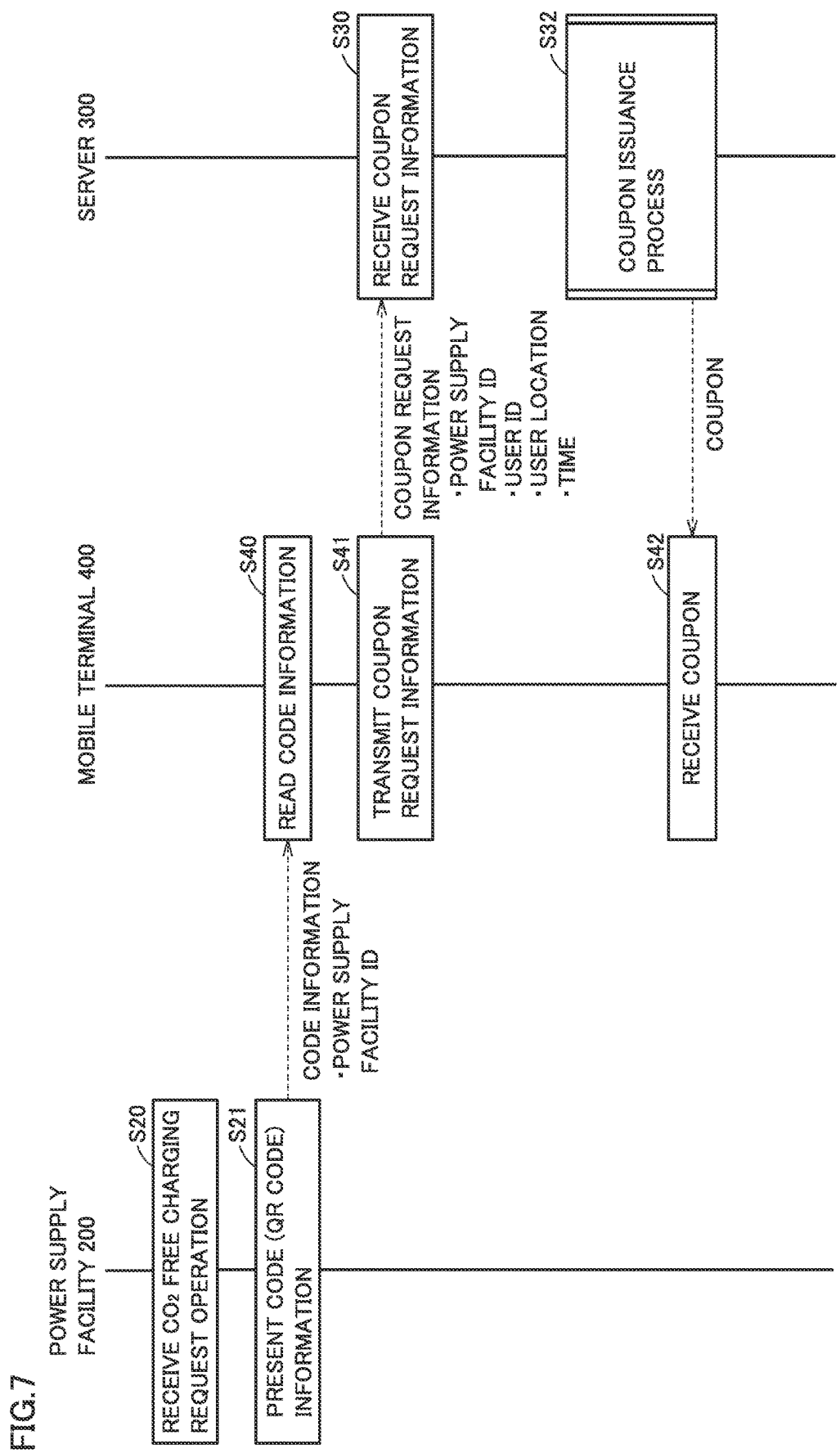
FIG. 7 is a (first) sequence diagram showing an exemplary overview of a coupon issuance process and a process associated with the coupon issuance process.

FIG. 7 is a sequence diagram showing an exemplary overview of the coupon issuance process and a process associated with the coupon issuance process. These processes are associated with power supply facility 200 (more specifically, control device 210), mobile terminal 400 (more specifically, control device 450), and server 300 (more specifically, control device 310).

Power supply facility 200 performs a process for receiving a $CO_2$ free charging request operation by the user (step S20). The $CO_2$ free charging request operation is an operation for requesting, by the user, power supply facility 200 to perform $CO_2$ free charging using power supply facility 200. For example, when the user pushes a $CO_2$ free charging start button (not shown) provided in power supply facility 200, power supply facility 200 receives the $CO_2$ free charging request operation by the user.

When the $CO_2$ free charging request operation by the user is received, power supply facility 200 presents code information on display device 274 (step S21). The code information is information required for the registered user to receive, from server 300, the coupon accompanied with the $CO_2$ free charging using power supply facility 200. The following describes a case where the code information includes: information indicating an access destination for server 300; information about the power supply facility ID for specifying power supply facility 200; and the like. It should be noted that the code information is presented as a one-dimensional code (such as a bar code) or a two-dimensional code (such as a QR code (registered trademark)), each of which is readable by mobile terminal 400 using camera 460, for example.

Mobile terminal 400 uses camera 460 to read the code information presented on display device 274 of power supply facility 200 (step S40). Mobile terminal 400 accesses the access destination for server 300 included in the read code information, and transmits the coupon request information to server 300 (step S41). The coupon request information includes: information indicating the power supply facility ID included in the code information; information indicating the user ID of the user who carries mobile terminal 400; information indicating the user location detected by location detection device 478; and information indicating the current time.

Server 300 receives the coupon request information from mobile terminal 400 (step S30). When the coupon request information is received, server 300 performs the coupon issuance process (step S32). In the coupon issuance process, it is determined whether to issue the coupon based on the coupon request information. When it is determined to issue the coupon, the coupon is issued to mobile terminal 400 corresponding to the user ID included in the coupon request information.

Mobile terminal 400 receives the coupon issued from server 300 (step S42). The user presents, on display device 474, the information indicating the coupon and received from server 300 so as to show it at shop 11, whereby the coupon can be used at shop 11.

It should be noted that in the present embodiment, it is illustrated that the coupon is transmitted from server 300 to mobile terminal 400; however, the present embodiment is not necessarily limited to transmitting the coupon from server 300 to mobile terminal 400. For example, the coupon may be managed within server 300. That is, the coupon can be used in the following manner: server 300 manages information of the coupon issued for the user ID and mobile terminal 400 accesses server 300.

Figure 8:
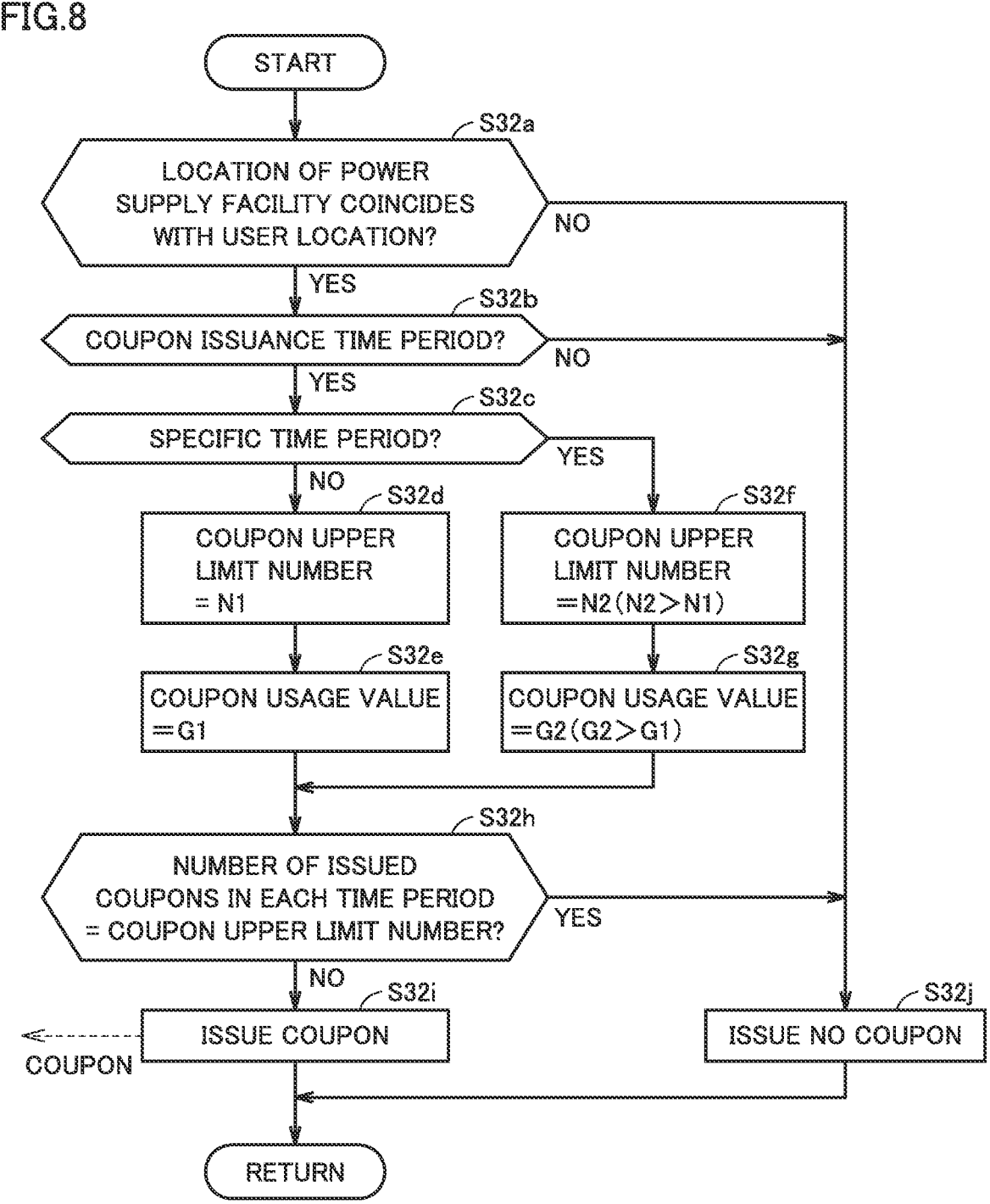
FIG. 8 shows an exemplary overview of the coupon issuance process performed by the server.

FIG. 8 shows an exemplary overview of the coupon issuance process (step S32 of FIG. 7) performed by server 300.

Based on the coupon request information received from mobile terminal 400, server 300 determines whether or not the installation location of the power supply facility and the user location coincide with each other (step S32a). Specifically, server 300 makes reference to the power supply facility information stored in storage device 320 so as to specify the installation location of the power supply facility corresponding to the power supply facility ID included in the coupon request information, and determines whether or not a distance between the specified installation location of the power supply facility and the user location included in the coupon request information is less than a predetermined value.

When the installation location of the power supply facility and the user location coincide with each other (YES in step S32a), server 300 determines whether or not the time included in the coupon request information (i.e., the timing to perform the $CO_2$ free charging) is included in a predetermined coupon issuance time period (for example, a time period from the opening time to closing time of shop 11) (step S32b).

When the time included in the coupon request information is included in the coupon issuance time period (YES in step S32b), server 300 determines whether or not the time included in the coupon request information is included in a specific time period of the coupon issuance time period (step S32c).

Here, the specific time period can be set appropriately in consideration of a situation as to attracted customers in shop 11, prediction of attracted customers, a situation as to surplus of $CO_2$ free power, and the like. For example, the specific time period can be set to at least one of the following time periods: a time period in which a customer attracting rate in shop 11 is lower than a predetermined rate; a time period in which an amount of surplus of the $CO_2$ free power that can be supplied by power supply facility 200 is more than a predetermined amount; and a time period in which weather is forecasted to be fine.

When the time included in the coupon request information is not included in the specific time period (NO in step S32c), server 300 sets a coupon upper limit number to a predetermined value N1 in time periods other than the specific time period (step S32d), and sets a usage value (usable amount, discount amount, discount rate, or the like) of each coupon to a predetermined value G1 (step S32e).

On the other hand, when the time included in the coupon request information is included in the specific time period (YES in step S32c), server 300 sets the coupon upper limit number in the specific time period to a predetermined value N2 larger than predetermined value N1 (step S32f) and sets the usage value of each coupon to a predetermined value G2 higher than predetermined value G1 (step S32g).

Next, server 300 determines whether or not the number of issued coupons in the time period (the specific time period or a time period other than the specific time period) including the current time has reached a corresponding coupon upper limit number (predetermined value N1 or predetermined value N2 described above) (step S32h).

When the number of issued coupons has not reached the coupon upper limit number (NO in step S32h), server 300 issues a coupon having the usage value set in step S32e or step S32g, to mobile terminal 400 having transmitted the coupon request information (step S32i).

On the other hand, when the installation location of the power supply facility and the user location do not coincide with each other (NO in step S32a), or when the time included in the coupon request information is not included in the coupon issuance time period (NO in step S32b), or when the number of issued coupons has reached the coupon upper limit number (YES in step S32h), server 300 issues no coupon (step S32j).

As described above, server 300 according to the present embodiment issues, to the user of vehicle 100 in which the $CO_2$ free charging is performed using power supply facility 200, a coupon usable at shop 11 located around power supply facility 200. In this case, when the timing to perform the $CO_2$ free charging is included in the specific time period, server 300 increases the coupon upper limit number (the number of issued coupons) and the usage value of each coupon as compared with a case where the timing to perform the $CO_2$ free charging is not included in the specific time period. Therefore, the user who performs the $CO_2$ free charging can obtain a larger number of coupons by visiting shop 11 and performing the $CO_2$ free charging in the specific time period. Moreover, shop 11 can increase the customer attracting rate by attracting a larger number of users in the specific time period. As a result, the $CO_2$ free charging (external charging using renewable energy) can be promoted appropriately in the specific time period.

Further, the specific time period can be set to the time period in which the customer attracting rate in shop 11 is lower than the predetermined rate. In this case, since the coupon upper limit number (the number of issued coupons) and the usage value of each coupon are increased in the time period (for example, a time period in a daytime of a weekday) in which the customer attracting rate in shop 11 is lower than the predetermined rate, the customer attracting rate in shop 11 during the time period in which the customer attracting rate is low can be improved, thus leveling out the customer attracting rate.

Moreover, the specific time period can be set to the time period in which the amount of surplus of the $CO_2$ free power that can be supplied by power supply facility 200 is more than the predetermined amount. In this case, since the coupon upper limit number (the number of issued coupons) and the usage value of each coupon are increased in the time period (for example, a time period in a daytime with large solar intensity in the case where the $CO_2$ free power is power generated using solar light) in which the amount of surplus of the $CO_2$ free power is large, the $CO_2$ free power can be effectively used while avoiding the surplus of the $CO_2$ free power from being unused.

Moreover, the specific time period can be set to a time period in which weather is forecasted to be fine. Accordingly, in accordance with an increase in the amount of surplus of the $CO_2$ free power (solar power) generated using the solar light in the case of fine weather, the coupon upper limit number (the number of issued coupons) and the usage value of each coupon can be increased in the time period in which weather is forecasted to be fine. Therefore, the $CO_2$ free power can be effectively used while avoiding the surplus of the $CO_2$ free power from being unused. Moreover, the user can obtain a larger number of coupons by visiting shop 11 and performing the $CO_2$ free charging in the time period in which weather is forecasted to be fine. Shop 11 can increase the customer attracting rate by targeting the time period in which weather is forecasted to be fine in order to attract a larger number of users.

<Modification 1>

In the above-described embodiment, it has been illustratively described that mobile terminal 400 reads the code information presented on display device 274 of power supply facility 200 and transmits the coupon request information to server 300 (see steps S40, S41 of FIG. 7).

However, the device that transmits the coupon request information to server 300 is not limited to mobile terminal 400. For example, a modification may be made such that power supply facility 200 transmits the coupon request information to server 300.

Figure 9:
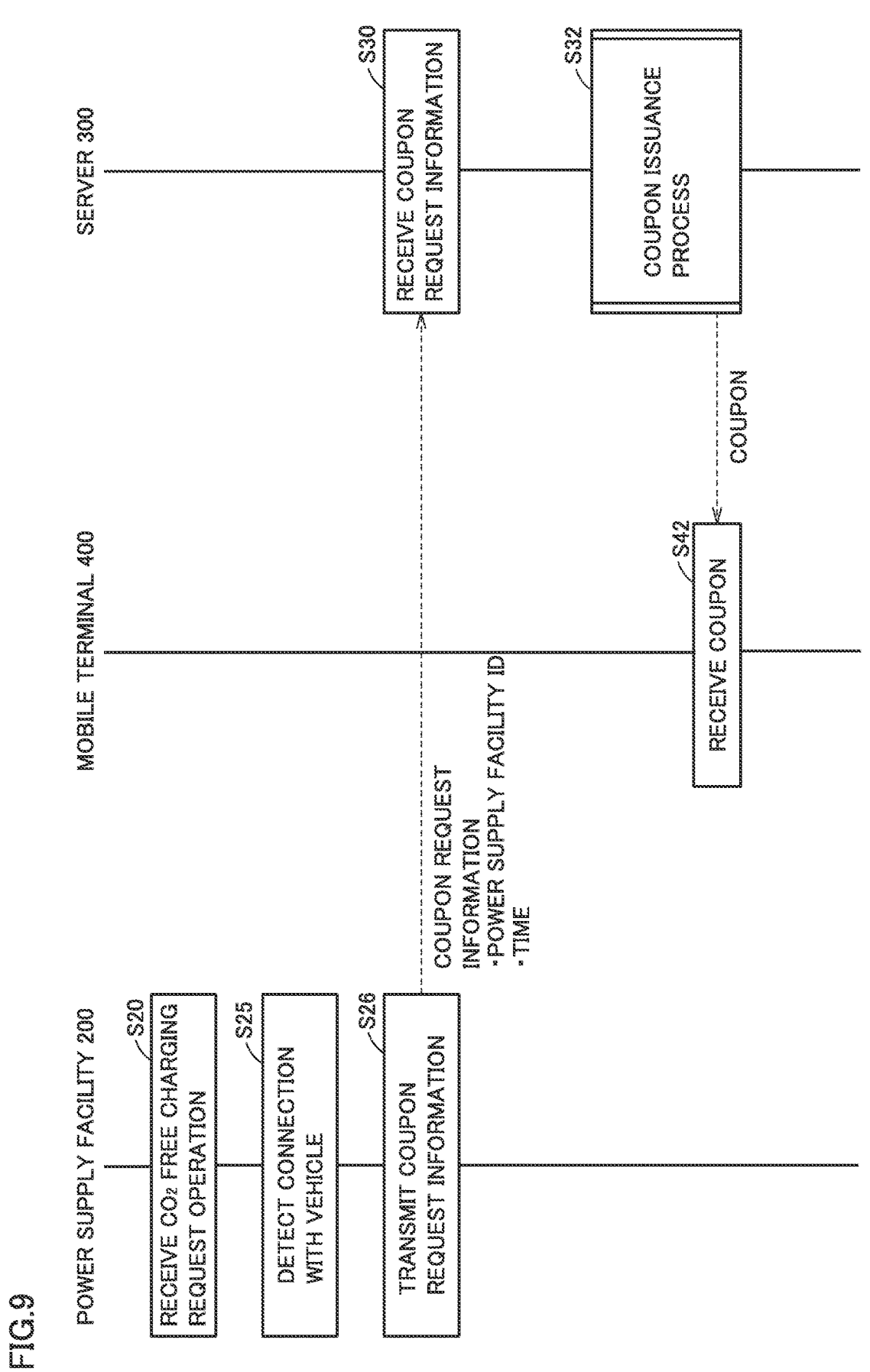
FIG. 9 is a (second) sequence diagram showing an exemplary overview of the coupon issuance process and the process associated with the coupon issuance process.

FIG. 9 is a sequence diagram showing an exemplary overview of a coupon issuance process and a process associated with the coupon issuance process according to a modification 1.

When the $CO_2$ free charging request operation by the user is received in step S20, power supply facility 200 detects connection with vehicle 100 (step S25). That is, power supply facility 200 determines whether or not it has been detected that charging cable 202 of power supply facility 200 is connected to vehicle 100.

When the connection with vehicle 100 is detected, power supply facility 200 transmits the coupon request information to server 300 (step S26). This coupon request information includes: information indicating the power supply facility ID of power supply facility 200; and information indicating the current time.

Server 300 receives the coupon request information from power supply facility 200 (step S30). When the coupon request information is received, server 300 performs the coupon issuance process (step S32). It should be noted that the coupon issuance process is similar to the process in the foregoing embodiment, and is therefore not repeatedly described here in detail. Mobile terminal 400 receives the coupon issued from server 300 (step S42).

As described above, power supply facility 200 may transmit the coupon request information to server 300.

<Modification 2>

In the above-described embodiment, it has been illustratively described that when the timing to perform the $CO_2$ free charging is included in the specific time period, both the coupon upper limit number (the number of issued coupons) and the usage value of each coupon are increased as compared with a case where the timing to perform the $CO_2$ free charging is not included in the specific time period.

However, instead of increasing both the coupon upper limit number (the number of issued coupons) and the usage value of each coupon, one of the coupon upper limit number (the number of issued coupons) and the usage value of each coupon may be increased.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A charging processing system comprising:
    a power supply facility that supplies $CO_2$ free power generated using renewable energy;
    an electrically powered vehicle in which $CO_2$ free charging is able to be performed to charge an onboard power storage device using the $CO_2$ free power supplied from the power supply facility;
    a mobile terminal portable by a user of the electrically powered vehicle; and
    a server that issues, when the $CO_2$ free charging is performed in the electrically powered vehicle, a coupon to the mobile terminal of the user of the electrically powered vehicle in which the $CO_2$ free charging is performed, the coupon being usable at a shop located around the power supply facility, wherein
    when a timing to perform the $CO_2$ free charging is included in a specific time period, the server increases at least one of the number of issued coupons and a usage value of each coupon as compared with a case where the timing to perform the $CO_2$ free charging is not included in the specific time period.

2. The charging processing system according to claim 1, wherein the specific time period includes a time period in which a customer attracting rate in the shop is lower than a predetermined rate.

3. The charging processing system according to claim 1, wherein the specific time period includes a time period in which an amount of surplus of the $CO_2$ free power suppliable by the power supply facility is more than a predetermined amount.

4. The charging processing system according to claim 1, wherein the specific time period includes a time period in which weather is forecasted to be fine.

* * * * *